(12) United States Patent
Metezeau et al.

(10) Patent No.: US 9,140,211 B2
(45) Date of Patent: Sep. 22, 2015

(54) CASCADE-TYPE THRUST REVERSER

(75) Inventors: Fabrice Metezeau, Montivilliers (FR); Vincent Dutot, Le Havre (FR); Tanguy Keraudren, Le Havre (FR)

(73) Assignee: AIRCELLE, Gonfreville L'Orcher (FR)

( * ) Notice: Subject to any disclaimer, the term of this patent is extended or adjusted under 35 U.S.C. 154(b) by 920 days.

(21) Appl. No.: 12/739,344

(22) PCT Filed: Sep. 10, 2008

(86) PCT No.: PCT/FR2008/001264
§ 371 (c)(1),
(2), (4) Date: Apr. 22, 2010

(87) PCT Pub. No.: WO2009/066037
PCT Pub. Date: May 28, 2009

(65) Prior Publication Data
US 2010/0251693 A1      Oct. 7, 2010

(30) Foreign Application Priority Data
Oct. 25, 2007  (FR) ...................................... 07 07501

(51) Int. Cl.
*F02K 1/72* (2006.01)
*F02K 1/82* (2006.01)

(52) U.S. Cl.
CPC . *F02K 1/72* (2013.01); *F02K 1/827* (2013.01); *Y02T 50/672* (2013.01)

(58) Field of Classification Search
CPC .......... F02K 1/72; F02K 1/827; Y02T 50/672
USPC ............... 244/110 B; 60/226.2, 228, 230; 239/265, 19, 265.25, 265.29, 265.37, 239/265.27, 265.39
See application file for complete search history.

(56) References Cited

U.S. PATENT DOCUMENTS

| | | | | |
|---|---|---|---|---|
| 3,241,312 A * | 3/1966 | Clark | ........................... | 244/73 R |
| 3,241,313 A * | 3/1966 | Alderson | ........................ | 60/230 |
| 3,241,771 A * | 3/1966 | Erwin | ...................... | 239/265.25 |
| 3,248,878 A * | 5/1966 | Clark et al. | ..................... | 60/229 |
| 3,262,270 A * | 7/1966 | Beavers | ........................ | 60/226.2 |
| 3,262,271 A * | 7/1966 | Beavers | ........................ | 60/226.2 |
| 3,281,082 A * | 10/1966 | Barclay | ..................... | 239/265.35 |
| 3,292,864 A * | 12/1966 | Edkins | ........................ | 244/12.5 |
| 3,292,880 A * | 12/1966 | Kutney | ........................ | 244/12.5 |
| 3,717,304 A * | 2/1973 | Sutton | ....................... | 239/265.19 |

(Continued)

FOREIGN PATENT DOCUMENTS

| | | |
|---|---|---|
| EP | 0983939 | 3/2000 |
| FR | 2804474 | 8/2001 |

OTHER PUBLICATIONS

International Search Report; PCT/FR2008/001264; Apr. 29, 2009.

*Primary Examiner* — Ehud Gartenberg
*Assistant Examiner* — Karthik Subramanian
(74) *Attorney, Agent, or Firm* — Brinks Gilson & Lione

(57) ABSTRACT

A cascade-type thrust reverser includes a fixed structure on which a rear frame supporting cascades of vanes is mounted, a mobile structure having an outer wall, an inner wall formed in part by an acoustic panel, a partition connecting the outer wall to the acoustic panel, and actuators interposed between the fixed structure and the mobile structure. The actuators extend through orifices formed in the rear frame and the partition. In particular, the rear frame radially interferes with the acoustic panel when the mobile structure is in a direct-jet position.

11 Claims, 3 Drawing Sheets

(56) References Cited

U.S. PATENT DOCUMENTS

| | | | |
|---|---|---|---|
| 3,797,785 A * | 3/1974 | Baerresen et al. | 244/53 R |
| 4,026,105 A * | 5/1977 | James | 60/226.2 |
| 4,193,569 A * | 3/1980 | Nichols | 244/100 R |
| 4,442,987 A * | 4/1984 | Legrand et al. | 244/110 B |
| 4,458,863 A * | 7/1984 | Smith | 244/54 |
| 4,596,621 A * | 6/1986 | Nawaz | 156/245 |
| 4,778,110 A * | 10/1988 | Sankey et al. | 239/265.29 |
| 4,823,547 A * | 4/1989 | Newton | 60/226.2 |
| 5,315,820 A * | 5/1994 | Arnold | 60/226.1 |
| 5,785,249 A * | 7/1998 | Metezeau et al. | 239/265.19 |
| 5,927,647 A * | 7/1999 | Masters et al. | 244/110 B |
| 6,000,216 A * | 12/1999 | Vauchel | 60/226.2 |
| 6,036,142 A * | 3/2000 | Yates | 244/23 D |
| 6,170,254 B1 * | 1/2001 | Cariola | 60/226.2 |
| 6,311,928 B1 * | 11/2001 | Presz et al. | 244/110 B |
| 6,385,964 B2 * | 5/2002 | Jean et al. | 60/226.2 |
| 6,557,799 B1 * | 5/2003 | Sternberger | 244/110 B |
| 7,007,454 B2 * | 3/2006 | Dehu et al. | 60/226.2 |
| 7,093,424 B2 * | 8/2006 | Hanlon et al. | 60/226.2 |
| 7,146,796 B2 * | 12/2006 | Lair | 60/226.2 |
| 7,264,203 B2 * | 9/2007 | Lair | 244/110 B |
| 7,562,520 B2 * | 7/2009 | Dehu et al. | 60/204 |
| 2003/0019206 A1 | 1/2003 | Johnson | |
| 2006/0101806 A1 * | 5/2006 | Ahrendt | 60/226.2 |
| 2006/0150613 A1 * | 7/2006 | Kruegel et al. | 60/226.2 |
| 2007/0234707 A1 * | 10/2007 | Beardsley | 60/226.2 |
| 2007/0237575 A1 * | 10/2007 | Dilno et al. | 403/410 |

* cited by examiner

CASCADE-TYPE THRUST REVERSER

TECHNICAL FIELD

The present invention relates to a cascade-type thrust reverser.

BACKGROUND

The attached FIGS. 1 and 2 depict a cascade-type thrust reverser of the prior art, in the direct-jet position.

As is known per se, a thrust reverser such as this comprises:
a fixed structure 1 on which a rear frame 3 supporting said cascades of vanes 5 is mounted,
a mobile structure 7 comprising an outer wall 9, an inner wall 11 formed in part by at least one acoustic panel 13, and at least one partition 15 connecting said outer wall 9 to said acoustic panel 13, and
actuators 16 interposed between said fixed structure 1 and said mobile structure 7, extending through orifices 17, 19 formed in said rear frame 3 and said partition 15 respectively.

FIG. 2 depicts the thrust reverser in the direct-jet configuration.

In this configuration, air from upstream of the thrust reverser, that is to say from the left in FIG. 2, flows along the flow path 21 situated between the mobile structure 7 and an inner fixed structure 23 in the downstream direction of the thrust reverser, that is to say to the right in FIG. 2, as indicated by the arrow F1.

Link rods 25 connect mobile panels 27, situated facing the cascades of vanes 5 and articulated to the mobile structure 7, to the inner fixed structure 23.

The switch from the direct-jet configuration to the indirect-jet configuration (not depicted) is performed by extending the actuators 16.

Under the effect of this extending, the link rods 25 pull the mobile panels 23 across the airflow path 21, causing air flowing along the flow path 21 to be deflected toward the outside and toward the upstream end of the thrust reverser, as indicated by the arrow F2, thus generating a reverse thrust that contributes to the braking of an aircraft that is attempting to land.

In practice, and notably for aerodynamic optimization reasons, it is appropriate for the radial thickness of the mobile structure 7 in the region of the cascades of vanes 5 to be as small as possible; this is particularly critical in the case of large nacelles, such as those intended for the engines of the Airbus A380.

Now, this reduction in thickness is limited notably by the radial thickness of the rear frame 3 and by a minimum radial distance d between this rear frame and the acoustic panel 13.

The radial thickness of the rear frame 3 cannot drop below a threshold value without carrying the risk of dangerously weakening the entire thrust reverser, and the minimum distance d ensures that the acoustic panel 13 does not come into contact with the rear frame.

It will therefore be appreciated that, in a conventional cascade-type thrust reverser, the radial thickness of the mobile part 7 in the region of the cascades of vanes, cannot drop below a certain threshold value.

BRIEF SUMMARY

The disclosure provides a solution that will allow this threshold value to be lowered, thus improving the aerodynamic performance of the power plant.

More particularly, the disclosure provides a cascade-type thrust reverser comprising:
a fixed structure on which a rear frame supporting said cascades of vanes is mounted,
a mobile structure comprising an outer wall, an inner wall formed at least in part by at least one acoustic panel, and at least one partition connecting said outer wall to said acoustic panel, and
actuators interposed between said fixed structure and said mobile structure, extending through orifices formed in said rear frame and said partition,
notable in that said rear frame and said acoustic panel are radially close enough to one another that they interfere with one another in a controlled way when said structure is in the direct-jet position.

Thus, contrary to received wisdom, the rear frame is allowed to come into contact with the acoustic panel because, against expectation, tests have proved that such contact is not detrimental to the integrity of the panel provided that this contact is controlled, that is to say that its characteristics (the extent of the region of contact, the intensity of this contact) are known precisely.

It should be noted that, in the context of the present invention, the expression "interfere with one another" denotes either direct contact or indirect contact (that is to say contact via additional components) of the rear frame with the acoustic panel.

According to other optional features of the present invention:
said rear frame comprises, in its region of interference with said acoustic panel, contact pads for contact with this panel; these contact pads make it possible to localize with precision the regions of contact of the rear frame with the acoustic panel, and thus play a part in correct control over the interference between these components;
said acoustic panel comprises, in its region of interference with said rear frame, contact plates for contact with this rear frame; these contact plates make it possible to localize with precision the regions of contact of the acoustic panel with the rear frame, and thus contribute toward good control of the interference between these components;
said pads and said plates are positioned in such a way as to collaborate with one another; the simultaneous presence of these pads and of these plates allows optimum control over the interference between the rear frame and the acoustic panel;
said contact pads are positioned on the downstream part of said rear frame, the upstream part of this rear frame is shaped in such a way that, at least in the circumferential regions in which said pads are situated, its radial distance with respect to said acoustic panel, or, as appropriate, with respect to said plates, is greater than the radial distance separating said pads from this acoustic panel or as appropriate, from said plates; this arrangement avoids the risk that the upstream part of the rear frame will come into contact with the acoustic panel or, as appropriate, with the plates, and therefore makes it possible to localize the region of interference of the rear frame with the acoustic panel to the downstream part of this rear frame exclusively;
said acoustic panel has recessed regions allowing said actuators to pass, and said pads are positioned in such a way as to collaborate with said recessed regions; these recessed regions are stronger regions of the acoustic panel and are therefore able to limit any risk of damage to the acoustic panel under the effect of contact with the rear frame;

said plates are positioned in said recessed regions; this arrangement is particularly advantageous because it allows the plates to be situated in a region where they do not add any additional radial thickness;

said rear frame is made of composite;

said pads are made of glass laps: this solution is particularly suitable when the rear frame is made of composite.

The present invention also relates to an aircraft nacelle equipped with a cascade-type thrust reverser as claimed in any one of the preceding claims.

BRIEF DESCRIPTION OF THE DRAWINGS

Other features and advantages of the present invention will become apparent from the description which follows, and from studying the attached figures in which.

DETAILED DESCRIPTION

Figure 1:
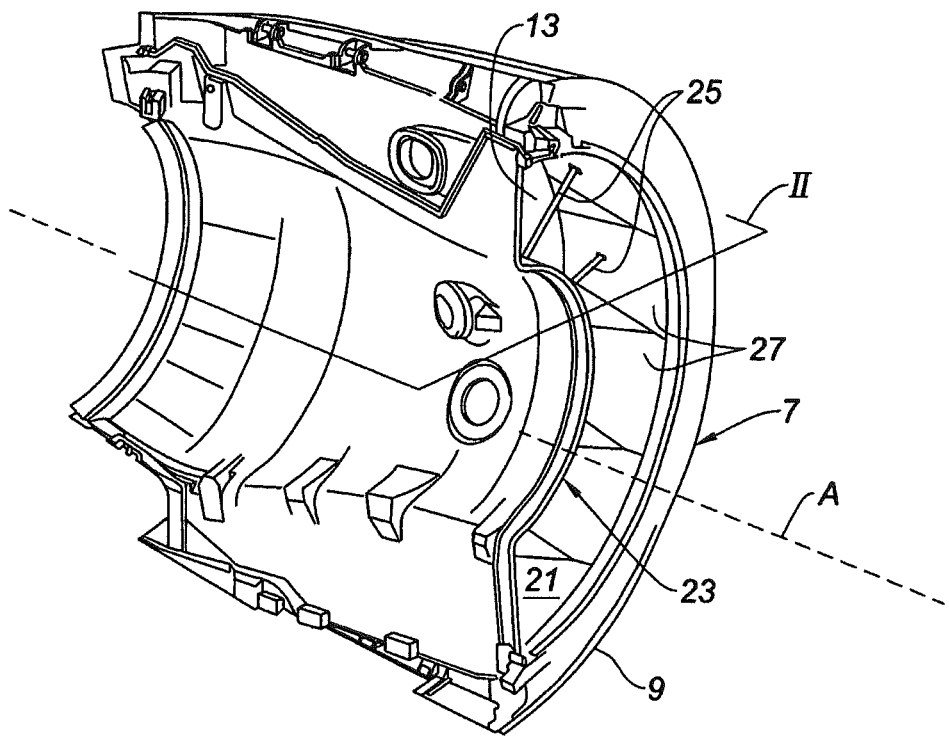
FIG. 1 is a perspective view of half a cascade-type thrust reverser of the prior art, in the direct-jet configuration, as mentioned in the preamble of this description.
Figure 2:
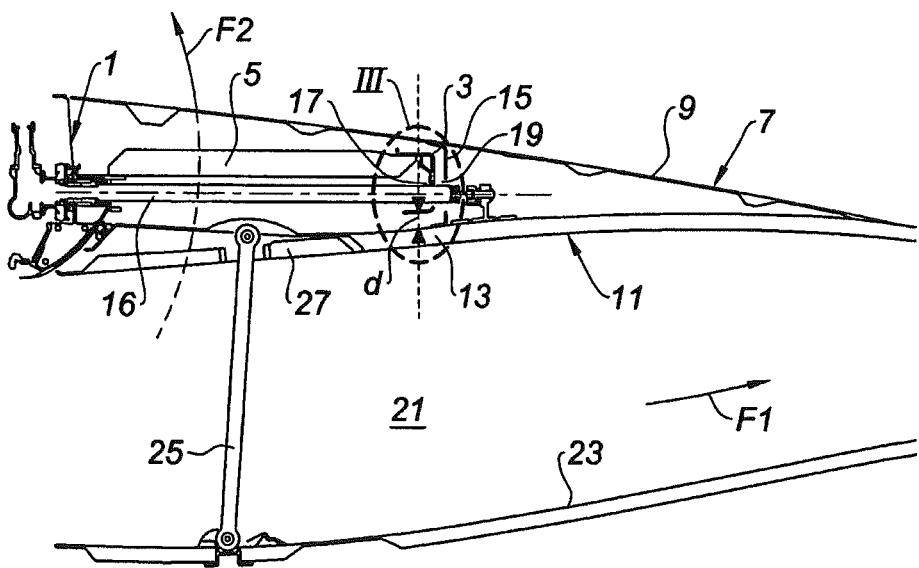
FIG. 2 is the reverser of FIG. 1 in cross section on II of that figure.
Figure 3:
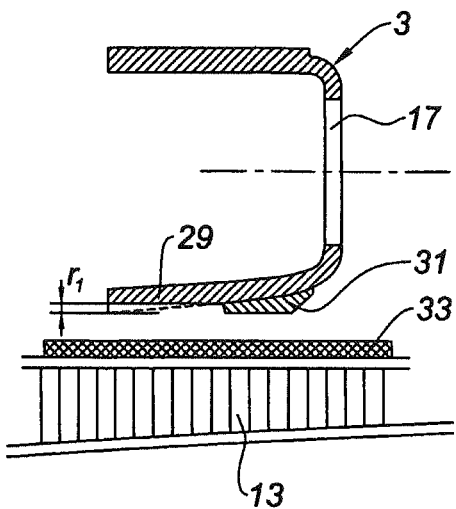
FIG. 3 is detail III of FIG. 2, for a cascade-type thrust reverser according to the invention.

Reference is now made to FIG. 3 which shows the rear cascade frame 3 comprising a plurality of orifices 17 (typically 2 to 3 per side) spaced apart circumferentially.

These orifices are for the passage of actuators 16 which are interposed between the fixed structure 1 and the inner wall 11 and thus allow the mobile structure 7 to be slid in the downstream direction (reverse-jet position) or the upstream direction (direct-jet position) of the thrust reverser.

As may be seen in FIG. 3, the rear frame 3 has a substantially U-shaped profile with its lower branch 29 comprising, on its face situated facing the acoustic panel 13, a plurality of pads 31 which are uniformly circumferentially spaced and/or carefully positioned at the points where the interference between the rear frame and the acoustic panel is the greatest.

These pads 31 are dimensioned in such a way as to constitute regions of contact of the lower branch 29 of the rear frame 3 with the acoustic panel 13 in that part of the travel of this acoustic panel during which the branch 29 and this panel are made to interfere with one another.

In FIG. 3, the pads 31 are separated from the panel by a certain distance because, for most loading scenarios, there is no interference: the interference occurs only in certain loading scenarios and then only in the direct-jet position (that is to say if the airplane is maneuvering with a great deal of relative displacement between structural elements).

As an alternative, to strengthen the region of contact of the pads 31 with the panel 13 it is possible to consider fitting plates 33, for example metal plates, in this region, these being distributed at appropriate points on the circumference of the acoustic panel 13.

In order to ensure good control over the regions of contact of the lower branch 29 of the rear frame 3, it is possible to remove a certain radial thickness r1 of the upstream part of this branch, so as to ensure that the radial distance of the pads 31 with respect to the acoustic panel 13 (or, where appropriate, with respect to the plates 33) is smaller than the radial distance separating the upstream part of the branch 29 from this acoustic panel (or, where appropriate, from the plates 33).

This then prevents any unwanted, that is to say uncontrolled, rubbing of the upstream part of the branch 29 of the rear frame 3 on the acoustic panel 13 or on the plates 33.

Figure 4:
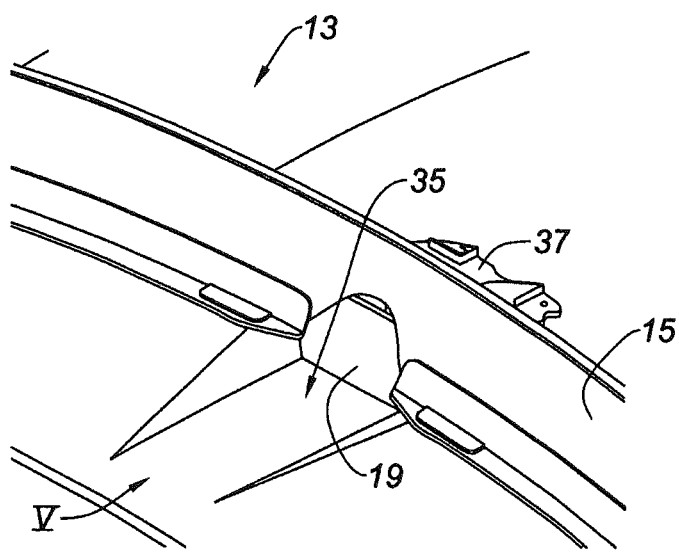
FIG. 4 is a perspective view of the region of connection of the partition 15 to the acoustic panel 13, in the case of a cascade-type thrust reverser according to the inventions.
Figure 5:
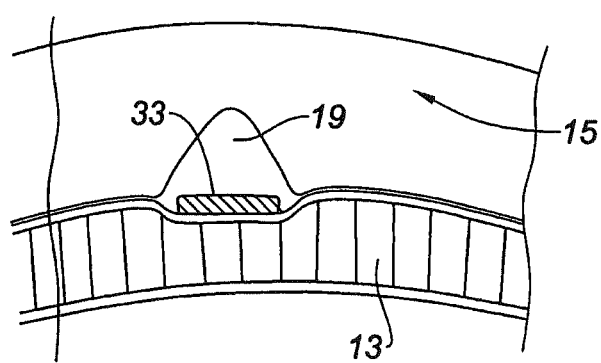
FIG. 5 is a view on V of FIG. 4 of this partition and of this acoustic panel.
Figure 6:
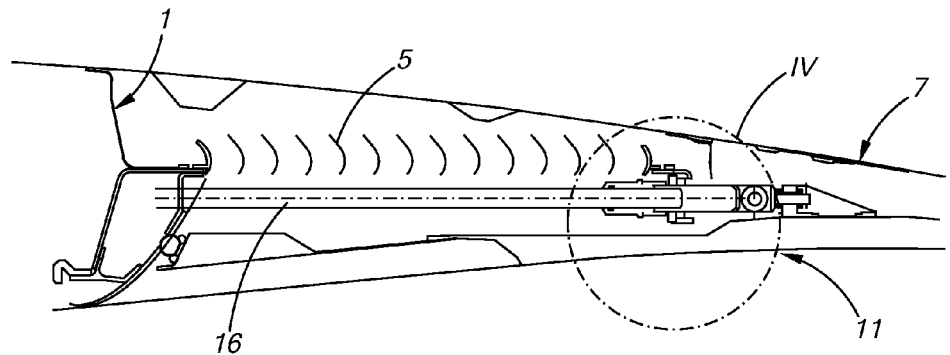
FIG. 6 is a cross-sectional view of a cascade-type thrust reverser in a direct-jet position according to the present disclosure.
Figure 7:
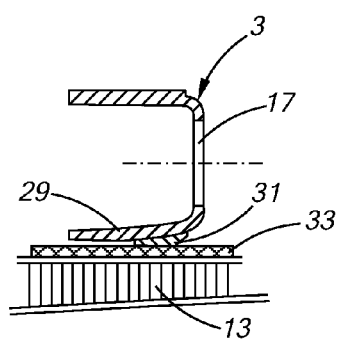
FIG. 7 is an enlarged view of IV region of FIG. 6, showing a contact between a rear cascade frame and an acoustic panel.
Figure 8:
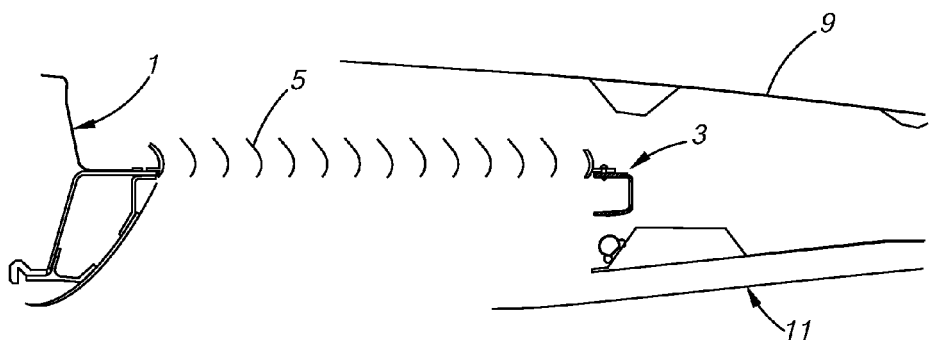
FIG. 8 is a cross-sectional view of a cascade-type thrust reverser in an indirect-jet position according to the present disclosure.

FIGS. 4 and 5 show a recessed region 35 formed on the acoustic panel 13 in line with the passage 19 for positioning the actuator 16, and the connection between the end of this actuator and a mounting plate 37 attached to the acoustic panel 13 downstream of the partition 15.

Of course it must be understood that there are several recessed regions 35 at the periphery of the acoustic panel 13, to allow each of the actuators that actuate the mobile structure 7 to pass.

These recessed regions 35 of the acoustic panel 13 are regions in which the honeycomb structure (not depicted) that makes up the acoustic panel 13 has a smaller thickness and a higher density, thus giving this acoustic panel greater resistance to compressive load in this region.

It will be appreciated that it may be advantageous for the pads 31 intended to come into contact with the acoustic panel 13 to be positioned precisely in such a way that they come into contact with the acoustic wall 13 in these recessed regions 35.

Advantageously, when provision is made to use contact plates 33, these plates 33 may be positioned in the recessed regions 35, as may be seen in FIG. 5.

The latter arrangement has the advantage that the plates 33 do not add radial thickness in relation to the acoustic panel 13, thus enabling them to contribute toward reducing the radial thickness of the mobile structure 7.

It will be noted that the rear frame 3 may be made notably of composite, and that in such a case, the pads 31 may be made of glass laps.

As may therefore be appreciated from the foregoing, the invention is a radical departure from the prior art.

Specifically, whereas in the state of the art, steps were taken to ensure that there was no contact between the acoustic panel 13 and the rear frame 3 throughout the travel of the mobile structure 7, in the present invention on the other hand such contact is allowed when the mobile structure 7 is in the direct-jet position.

Nonetheless, precautions are taken to ensure that this contact is controlled, that is to say perfectly known both in terms of the region in which it occurs and in terms of the intensity thereof.

This control is achieved by means of pads added under the lower branch of the rear frame 3, these pads making it possible to achieve point contact with the acoustic panel 13 or with the plates 33, that is to say contact of which the characteristics are perfectly known.

By allowing such contacts, it is possible to dispense with the large clearances that were provided in the prior art between the rear frame 3 and the acoustic panel 13, thus achieving an appreciable reduction in the radial thickness of the mobile structure 7 in the region of the cascades of vanes 5.

Stated differently, it may be said that for a given thickness of mobile structure 7 aerodynamic lines in the region of the rear frame 3, it is possible to offer more space for designing this rear frame 3. Such a rear frame will be lighter in weight for the same flexural inertia as a rear frame that has had to be designed to accommodate greater clearance with respect to the mobile structure.

The invention claimed is:

1. A cascade-type thrust reverser comprising:
    a fixed structure on which a rear cascade frame supporting cascades of vanes is mounted;
    a mobile structure comprising an outer wall, an inner wall formed at least in part by at least one acoustic panel, and at least one partition fixedly mounted on said outer wall and said acoustic panel; and
    actuators interposed between said fixed structure and said mobile structure, allowing the mobile structure to be slid in a downstream direction or in an upstream direction of the thrust reverser, said actuators extending through orifices formed in said rear cascade frame and said partition,
    wherein the fixed structure and the mobile structure move relative to one another, and said rear cascade frame on the fixed structure and said acoustic panel on the mobile structure contact each other when said mobile structure is in a direct-jet position, and said rear cascade frame on the fixed structure and said acoustic panel on the mobile structure do not contact each other when said mobile structure is in an indirect-jet position.

2. The thrust reverser as claimed in claim 1, wherein said rear cascade frame comprises, in a region of contacting with said acoustic panel, contact pads for contact with said acoustic panel.

3. The thrust reverser as claimed in claim 1, wherein said acoustic panel comprises, in a region of contacting with said rear cascade frame, contact plates for contact with said rear cascade frame.

4. The thrust reverser as claimed in claim 2, wherein said contact pads are positioned in such a way as to contact one another.

5. The thrust reverser as claimed in claim 2, wherein said contact pads are positioned on the downstream part of said rear cascade frame, and the upstream part of said rear cascade frame is shaped in such a way that, at least in the circumferential regions in which said contact pads are situated, its radial distance with respect to said acoustic panel is greater than the radial distance separating said contact pads from said acoustic panel.

6. The thrust reverser as claimed in claim 2, wherein said acoustic panel has recessed regions allowing said actuators to pass, and said contact pads are positioned in such a way as to contact said recessed regions.

7. The thrust reverser as claimed in claim 3, wherein said contact plates are positioned in recessed regions.

8. The thrust reverser as claimed in claim 1, wherein said rear cascade frame is made of composite.

9. The thrust reverser as claimed in claim 2, wherein said rear cascade frame is made of composite and wherein said contact pads are formed of glass laps.

10. An aircraft nacelle equipped with a cascade-type thrust reverser as claimed in claim 1.

11. The thrust reverser as claimed in claim 3, wherein said contact plates are positioned in such a way as to contact one another.

* * * * *